(12) United States Patent
Ledbetter et al.

(10) Patent No.: US 8,307,545 B1
(45) Date of Patent: Nov. 13, 2012

(54) LIGHTWEIGHT PORTABLE ELECTRICAL EQUIPMENT RACKING TOOL

(76) Inventors: Finley Lee Ledbetter, Argyle, TX (US); Ashley Ledbetter, Argyle, TX (US)

( * ) Notice: Subject to any disclaimer, the term of this patent is extended or adjusted under 35 U.S.C. 154(b) by 409 days.

(21) Appl. No.: 12/698,828

(22) Filed: Feb. 2, 2010

Related U.S. Application Data

(63) Continuation-in-part of application No. 12/500,523, filed on Jul. 9, 2009, now Pat. No. 8,151,452.

(60) Provisional application No. 61/084,897, filed on Jul. 30, 2008.

(51) Int. Cl.
*B23P 19/00* (2006.01)

(52) U.S. Cl. .............. 29/762; 29/270; 29/756; 29/764; 200/50.21; 200/50.24; 200/50.26

(58) Field of Classification Search ............ 29/762, 29/270, 278, 428, 622, 623, 756, 764, 876; 200/50.21, 50.24, 50.26, 200, 296
See application file for complete search history.

(56) References Cited

U.S. PATENT DOCUMENTS

| | | |
|---|---|---|
| 5,477,017 A | 12/1995 | Swindler et al. |
| 6,777,627 B1 | 8/2004 | Stevenson |
| 6,897,388 B2 | 5/2005 | Greer |
| 6,951,990 B1 | 10/2005 | Miller |
| 7,019,230 B1 | 3/2006 | Vaill et al. |
| 7,825,344 B2 * | 11/2010 | Stevenson ............... 200/50.24 |

* cited by examiner

*Primary Examiner* — Thiem Phan
(74) *Attorney, Agent, or Firm* — Gardere Wynne Sewell LLP

(57) ABSTRACT

A lightweight portable electrical equipment racking tool and a method for racking, wherein the racking tool is adapted to raise or lower a gear assembly while operating the gear assembly to remove or install electrical equipment from a safe distance. The lightweight portable electrical equipment racking tool can include a cart, load bearing wheels, small wheels, a fixed mast segment, a moveable locking bracket, a moving slide segment, a flanged moveable locking bracket, a clutch assembly plate, a clutch bracket, a gear assembly, a drive assembly motor, a motor control, a controller, a clutch, a drive coupling, a power supply, and a support gusset.

15 Claims, 6 Drawing Sheets

LIGHTWEIGHT PORTABLE ELECTRICAL EQUIPMENT RACKING TOOL

CROSS-REFERENCE TO RELATED APPLICATIONS

The present application is a continuation-in-part of co-pending U.S. patent application Ser. No. 12/500,523 filed Jul. 9, 2009, entitled "PORTABLE ELECTRICAL EQUIPMENT RACKING TOOL", which claims priority and the benefit of U.S. Provisional Patent Application Ser. No. 61/084,897 filed on Jul. 30, 2008, entitled "CIRCUIT BREAKER REPLACEMENT TOOL". These references are incorporated herein in their entirety.

FIELD

The present embodiments generally relate to a lightweight portable moveable tool for automatically inserting and removing circuit breakers or similar types of electrical devices from an electrical panel prone to arcing, such as a cell of circuit breakers or a circuit breaker cabinet. The lightweight portable moveable tool can use a remote control to allow a user to remain at a distance from possible arcing and to keep the user safe from shock and burns.

BACKGROUND

Arc-flash can result from a rapid release of energy due to an arcing fault between a phase bus bar and another phase bus bar, such as a neutral or a ground.

During an arc fault, air can operate as a conductor of electricity. Air can assist in producing an arc similar to an arc obtained during electric welding. The "arc fault" can typically be manually started by a failure along a path of conduction, such as a breakdown in insulation or an electrical short.

The cause of the short can often burn away during the initial flash or arc flash. The arc flash can be sustained by the establishment of a highly conductive plasma around the arc fault. In arc flash incidents, the majority of injuries and deaths can occur from an explosion or from burns.

The plasma from the arc flash can conduct as much energy as is available, and can be limited only by the impedance of the arc. The energy discharge during an arc flash can burn the bus, can vaporize copper in electrical devices, and can cause an explosive volumetric increase also herein referred to as an arc blast. The arc blast can have an expansion of 40,000 to 1. The arc blast can devastate everything in its path, can create deadly shrapnel as it dissipates, and can cause serious burns to any humans handling the related equipment.

Several incidents have occurred in recent years which have resulted in injury and death due to these arc blasts.

The majority of these arc blast incidents occurred while a circuit breaker was being installed or removed from a circuit breaker cabinet. Since removing and installing circuit breakers can require a user to be in close proximity to switchgear being removed or installed, and on some occasions to be physically in the circuit breaker cabinet itself, it can be a highly hazardous activity.

A need has long existed for a device that enables the installation or removal of electrical devices, such as circuit breakers, to be done with a remotely operated vehicle that can install or remove circuit breakers or similar types of electrical devices from an electrical panel.

A need has existed for a device designed for safety, reliability, and for protecting a user from an arc blast.

A need exists for a device that can be used on existing switchgear and circuit breakers not designed for remote installation and removal.

The present embodiments meet these needs.

BRIEF DESCRIPTION OF THE DRAWINGS

The detailed description will be better understood in conjunction with the accompanying drawings as follows.

Figure 1:
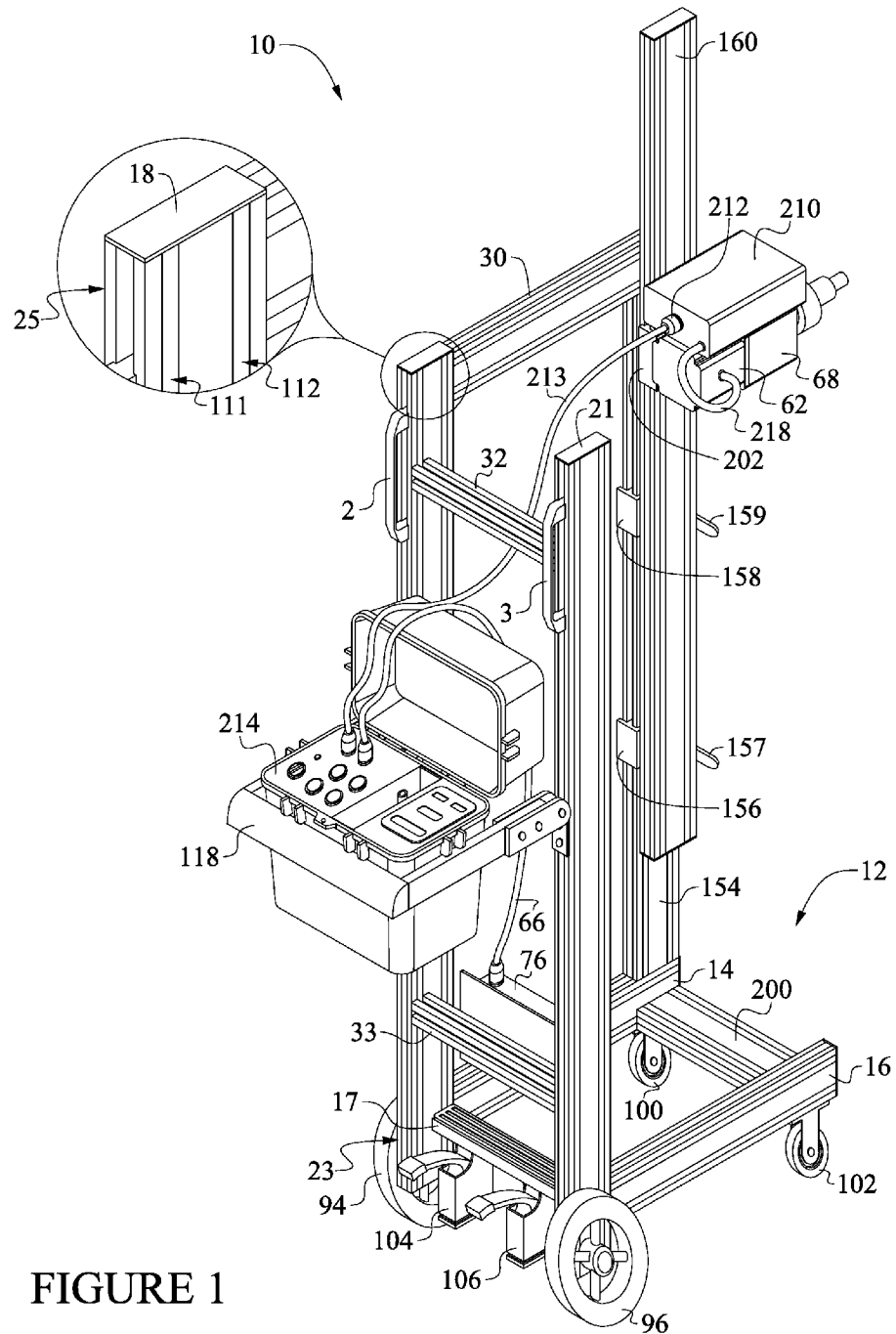
FIG. 1 is a perspective view of a lightweight portable electrical equipment racking tool.

The present embodiments are detailed below with reference to the listed Figures.

DETAILED DESCRIPTION

Before explaining the present apparatus and method in detail, it is to be understood that the apparatus and method is not limited to the particular embodiments and that it can be practiced or carried out in various ways.

Embodiments include a lightweight electrical equipment racking tool that can be adapted for remote operation protecting a user from being burned during circuit breaker engagement or disengagement.

The racking tool can prevent an operator from being burned when they attempt to install new circuit breakers or remove old electrical circuit breakers or similar high voltage components while current is still operating in adjacent panels. The racking tool is particularly useful for environments such as hospitals and chemical plants which generally can not turn off all power to a facility in order to safely replace circuit breakers.

The racking tool includes a cart which can be made from a generally hollow aluminum tubular, or another form of rigid lightweight non-deforming material, such as polycarbonate. The tubular can have a diameter of about 1 inch to about 2 inches.

The cart can be moveable, and even portable, that is, light enough for a user or operator to roll around the floor without assistance or lift into a pick up truck flatbed without needing a crane or other heavy object hoist.

In one or more embodiments, the cart, with all of the equipment loaded onto the cart, can weigh less than 200 pounds.

The racking tool can be used for "racking" circuit breakers and other electrical equipment without shutting down the electrical equipment.

The term "racking", as used herein, refers to the installation or removal of electrical equipment, such as a circuit breaker, from a device, such as an electrical cabinet or a circuit breaker cell, which circuit breakers, when removed can cause arc flashes that can provide at least $3^{rd}$ degree burns, sometimes $2^{nd}$ degree burns, and occasionally $1^{st}$ degree burns.

"Racking" can involve linearly moving electrical equipment completely in or out from a housing or cabinet, thereby enabling circuit breaker cells or similar units to be serviced, cleaned, or repaired.

The racking tool can provide remote robotic racking rather than manual racking. Remote robotic racking can allow a user to perform "racking" while power is still being supplied to an electrical cabinet, and the user is some distance from the racking tool, even if the user is electrically connected, such as by a wire that is 20 feet long, or by a radio wave or a cellular phone frequency to execute on, off, and other commands from a distance from the actual circuit breakers.

The cart in an embodiment has a base frame with at least two wheels, which can be castors.

The base frame of the cart can be formed from a four-part construction, that is, four bars welded together or four parts bolted together. The base frame can be formed as an extruded one piece metal frame that is generally in the shape of a square or a rectangle.

A first riser can project upwardly from a first side of the base frame. A second riser can project upwardly from a second side of the base frame. Each riser may be made of a hollow tubular. The first and second riser can be anywhere from 4 feet long to over 12 feet long, and in many instances 5 feet in length from the base frame connection to the other end of the riser.

A first slide support can be connected to the first riser at a point midway between where the first riser connects the base frame, which connection point is referred to herein as "the first riser base" and the other end of the first riser, which is referred to herein as the "first riser top." A second slide support can be connected to the second riser at a point midway between where the second riser connects to the base frame which is referred to herein as "the second riser base" and the other end of the second riser, which is referred to herein as "the second riser top".

At least one brace can be disposed between and connected to the first and second risers. Each brace can be a made of hollow square metal tubing or be a rectangular tube. Each brace can have an inner diameter ranging from about 0.25 inches to about 0.5 inches. The braces in an embodiment may be solid aluminum bars.

Two load bearing wheels can be connected to the base frame near a back side of the base frame for transporting the cart. The riser and base frame combination forms a "back side" and a "front side". Two small wheels can be connected to the base frame at a front side of the base frame opposite the back side for enhanced stability. The wheels can be pivoting wheels or fixed wheels. The load bearing wheels can be pneumatic rubber, solid rubber, nylon or a rubber coated metal. The load bearing wheels can be made of rubber disposed over a steel wheel.

The coated wheels, and the rubber improve the insulating properties of the cart, preventing shocking and prevent jarring during rolling around on the floor.

The small wheels can be castor wheels which can enable lighter weight shipping while simultaneously providing ease of movement and stability to the cart. The small wheels can have diameters that are from about 20 percent to about 30 percent the diameter of the load bearing wheels. The small wheels can be made from nylon, hard rubber, softer rubber, an insulating material, or another material. The wheels can be locking wheels.

The load bearing wheels can have a diameter from about six inches to about sixteen inches. The first and second small wheels can have a diameter from about three inches to about eight inches.

The load bearing wheels can be external to the first and second risers and can be outside of the perimeter of the base frame. The small wheels can be within the perimeter of the base frame.

The racking tool can include a motor, which can be an AC/DC single speed motor that can move a portion of the racking tool away from the risers and back into the risers enabling horizontal removal or installation of a circuit breaker. The motor can also be used to raise or lower relative to the floor, the portion of the racking tool that engages the circuit breaker. In one or more embodiments, the motor can be a variable speed electric motor. The motor can be a ⅓ horse power, 3400 revolutions per minute, and 250 Watt motor. An example motor usable with the invention can be one made by Ningbo EMP DC Motor Dynamics Co. of China, such as model M4-7271508B.

A gear assembly can be connected to the motor, and a clutch can be connected to the gear assembly and operated remotely by the operator. The clutch can enable the motor to operate in forward, neutral, and reverse. The clutch can be a mechanical 35 foot pound clutch. Drive couplings can be attached to the clutch, such as drive couplings made by CBS ArcSafe, Inc. of Denton, Tex. The geared motor can then be kept running in idle while a circuit breaker is removed from or attached to the tool during overall installation or maintenance of the circuit breaker cabinet.

The gear assembly can include a drive assembly with a motor. The drive assembly can be moved up and down rails of a high lift mast with a hand operated crank or by operation using a motor. In one or more embodiments, the drive assembly can be able to be oriented at an angle from about 50 degrees to about 90 degrees from the base frame.

At least one AC/DC power supply and a battery charger can be mounted to a housing and can be connected to at least one battery for charging the battery when hooked up to an external AC power source. The power supply can run the tool independent of engagement with a wall socket or generator, providing remarkable portability. Both the tool and the remote control device can be battery operated and chargeable.

An example of a usable AC/DC power supply can be one made by Iota of the U.S.A. A small generator can also be used to charge the batteries.

The racking tool can be operated while attached to a wall outlet, using an inverter if needed. However, a feature of the racking tool, is that the tool can operate freely without cords that can trip operators or cords that can further cause arcing or shocking The racking tool can run on DC current.

A controller remotely controls the racking tool. The controller can be a pendant station which is also battery operated. The controller can be connected by a wire to the racking tool or wirelessly to the racking tool.

A first floor lock, such as those made by Hammerlock, part number 909 LK-42SA, can be bolted or welded to the back side of the base frame. A second floor lock can also be connected to the back side.

The floor locks removably and lockingly engaging the base frame with a surface, such as a concrete floor. The floor locks hold the device to the floor so the cart does not slide during use. The floor locks can be suction cup floor locks.

A protective hoop can extend from the first riser to the second riser and can provide a load bearing non-deforming barrier between the risers and the surface. The protective hoop can prevent fragile parts of the cart from breaking.

The electrical equipment racking tool can be adapted for use with circuit breakers having a voltage less than about 38,500 volts AC.

In one or more embodiments, the cart can be formed of 100 percent extruded aluminum channel, 100 percent chrome steel molybdenum tubing, or combinations thereof, such that the cart can be lightweight and strong.

A wireless video camera can be mounted to a camera bracket connected to one of the risers. The camera can connect with a motor control.

The wireless video camera may also communicate with a remote video receiver enabling handheld monitoring of signals from the wireless video camera. The remote video receiver can be one made by Sony or Insignia.

At least one light, such as a light emitting diode "LED" or a halogen spotlight, can be connected to an auxiliary power bus and can be mounted to the cart enabling the camera to take pictures even in dark spaces. The light should be explosion proof and rugged, such as those made by Magnalight™

A high lift mast is used with the cart and has a length from about 4.5 feet to about 8 feet. The high lift mast can elevate the drive assembly from about 3 inches to about 90 inches above the risers. The high lift mast is secured to the risers with locking brackets.

One or more embodiments the locking brackets are moveable. In some embodiment, the locking brackets are C-shaped, such as locking brackets made by Bosch of Germany.

The moveable locking brackets can be adjusted upwards and downwards along a moving slide segment. The moving slide segment can hold the motor and drive couplings above a surface, such as a concrete floor. The second movable locking bracket should be disposed in a spaced apart relationship from the first moveable locking bracket.

One or more embodiments of the invention includes a method for installing and/or removing electrical equipment and a method for racking electrical equipment.

A first step of the method can include positioning the racking tool adapted for remote operation near a piece of electrical equipment, such as a circuit breaker cabinet in a hospital.

The racking tool can be very versatile and can host many different sizes of electrical equipment couplings. For example, the hospital may have a circuit breaker room with circuit breakers of one size for an air conditioning and circuit breakers of a second size for lights. The racking tool can allow the hospital to rack both sizes of circuit breakers without needing anything more than a second coupling to be connected to the racking tool.

A second step of the method can include the aligning drive coupling on the cart which is mounted to the high lift mast with the circuit breaker or other electrical equipment in need of racking.

The aligning drive coupling on the racking tool can be raised, lowered, angled, moved left, or moved right so that properly alignment with the circuit breaker occurs.

Next, a connecting/disconnecting tool is attached to the drive coupling of the racking tool.

The racking tool is then engaged or connected to with the electrical equipment using the coupling and connecting/disconnecting tool.

A user operates the drive assembly using the remote control of the racking tool, such as a remote pendant station, to rotate the drive coupling until the electrical equipment is fully installed or fully removed.

The remote control, which is also referred to a "controller" herein, such as the remote pendant station can be operated at a safe distance from the electrical equipment racking tool by the user, and the user is safe from any arc flashing that might occur.

The tool and method can be used with circuit breakers, a load break switch, a non-load break switch, motor contactors, high-voltage distribution interrupters, switches, sectionalizers, or another piece of electrical equipment.

Embodiments of the invention can include a racking tool which can handle circuit breakers of medium voltage. Medium voltage as the term is used herein refers to a voltage from less than about 1,000 volts to about 38,500 volts.

The racking tool can also be used to remove and install high-voltage circuit breakers which operate in voltages exceeding 38,500 volts. The racking tool can also be used to install or remove low voltage circuit breakers, wherein the voltage of the low voltage circuit breakers can be up to about 1,000 volts.

An embodiment contemplates that the cart may have tubular components which may be perforated to reduce the overall weight of the cart, such as the base frame may be perforated to reduce overall weight.

The cart can be coated, such as with a paint, to reduce ionic or static charges.

Hollow rectangular tubes, rather than solid rods, can provide the benefit of enabling the cart to be lightweight which enables ease of movement of the cart.

Each riser can be designed to ensure a strong non-deforming and rigid cart able to support the weight of a motor and a drive assembly without bending, or otherwise moving out of the initial alignment.

In another embodiment, the racking tool may have in each riser, at least one channel can be disposed on each side of each riser. The channel on each riser, and some risers can have 2 channels or 4 channels, enable secure engagement with another component in a sturdy and slidable manner, such as with the high lift mast, enabling a locking engagement for a secure sliding arrangement.

The drive assembly can be secured to the moveable locking bracket, which can be flanged in an embodiment.

The drive assembly can be moved from a first position adjacent the base frame to a second position anywhere along the movable slide segment above the base frame, thereby allowing for versatility of use without the need for a user to touch the drive assembly. The movable slide segment is also referred to herein as the "high lift mast".

In an embodiment, the power supply that powers the motor can be a fuel cell, a lead-acid battery, a lithium ion battery, or another power supply. The power supply must be lightweight enough to enable the racking tool to be portable and moveable. The power supply must be integrated with the cart such that there are no loose wires to trip a user or to conduct a charge of electricity in the case of an electrical short or an arc.

The amount of torque applied to the motor of the drive assembly can be limited by the use of a mechanical clutch. The drive assembly can be used to limit torque applied to the circuit breaker while racking the circuit breaker. The torque can be mechanically limited via a slip clutch inline with the motor of the drive assembly.

An automatic shutoff can engage a brake for slowing the motor while simultaneously shutting off the power supply to the motor.

In an embodiment, an electronic device can be included on the racking tool for continuously measuring a current draw of the racking tool. The electronic device can automatically shut down the racking tool when a trip point or a preset limit of current draw is reached. The preset limit can be entered or programmed into a data storage of the electronic device, such as by a user. The electronic device can recognize when an electric current level equals or exceeds the preset limit, and the electronic device can automatically shut down the racking tool when the preset limit is reached.

In another embodiment, the drive assembly can use a clutch assembly plate, drive coupling, gear assembly, and motor control to raise or lower the coupling by sliding the flanged moveable locking bracket up or down the moving slide segment.

One or more embodiments can include an additional a fixed mast segment gusset that provides reinforcement to the tool, enabling the structural components of the racking tool to be at least three times stronger and resistant to deformation caused from torquing than the first or second riser gussets.

The tool can be adapted for remote installation or removal of circuit breakers having a voltage less of than 38,500 Volts AC.

The cart can be made from a reinforced non-deforming high temperature resistant composite polymer in another embodiment, rather than from the aluminum.

Turning now to the Figures, FIG. 1 shows a lightweight portable electrical equipment racking tool adapted for remote operation.

The cart 10 can have a base frame 12 having a first support 14 and a second support 16 connected to a back support 17. A front support 200 can be disposed between the first and second supports.

A first riser 18 can be connected or attached to the first support 14. The first riser 18 can have a first riser bottom portion 23 and a first riser top portion 25.

A second riser 21 can be connected to the second support 16 opposite the first riser 18.

A first channel 111 and a second channel 112 can be disposed in parallel on the first riser 18.

A first slide support 30 can connect to the first riser 18 proximate the first riser top portion 25 and can extend therefrom.

A first brace 32 can connect between the first riser 18 and the second riser 21 providing support, spacing, and a sturdy frame. A second brace 33 can connect between the first riser 18 and the second riser 21.

A first load bearing wheel 94 can connect to the first riser 18. A second load bearing second wheel 96 can connect to the second riser 21. The load bearing wheels can enable the cart 10 to move without damage along a surface by a single person, rather than requiring multiple people to move the racking tool.

A first small wheel 100 can be secured to the first support 14 opposite the first load bearing wheel 94. A second small wheel 102 can be secured to the second support 16 opposite the second load bearing wheel 96.

First and second floor locks 104 and 106 can be connected to the back support 17 for removably and lockingly engaging the base frame 12 with a surface.

A fixed mast segment 154 can connect at a perpendicular angle to the first slide support 30 and the first support 14. The fixed mast segment 154 can be made from extruded hollow aluminum and can include channels such as those formed in each of the risers.

A first and second moveable locking brackets 156 and 158 can be secured to the fixed mast segment 154, enabling the high lift mast (also referred to herein as the "moving slide segment") to be moved upwards and downwards by raising or lowing a gear assembly 68 and enabling the racking tool to be usable at a variety of heights.

A moving slide segment 160 can be connected to the moveable locking brackets 156 and 158. The moveable locking brackets can be operated by moveable locking bracket levers 157 and 159, for extending the moving slide segment 160 above the base frame 12. The moveable locking bracket levers can be used to lock the moveable locking brackets in place or to unlock the moveable locking brackets, enabling the moving slide segment 160 to move up or down.

A flanged moveable locking bracket 202 can hold the gear assembly 68 and other motor controller components to the cart 10.

The cart 10 can have a first and a second handle 2 and 3. A protective hoop 118 can connect between the first riser 18 and the second riser 21, providing a load bearing non-deforming barrier between the risers and the surface. A controller 214 can be removably mounted to the protective hoop 118.

The controller 214 can be in communication with a motor control 210 through a motor control cable 213. The motor control cable can engage a motor control plug 212. The motor control 210 can be in communication with a drive assembly motor 62 through a cable 218 for controlling the gear assembly 68.

Also shown is a power supply 76 which can be in communication with the controller 214 and can provide power to the controller through cable 66.

Figure 2:
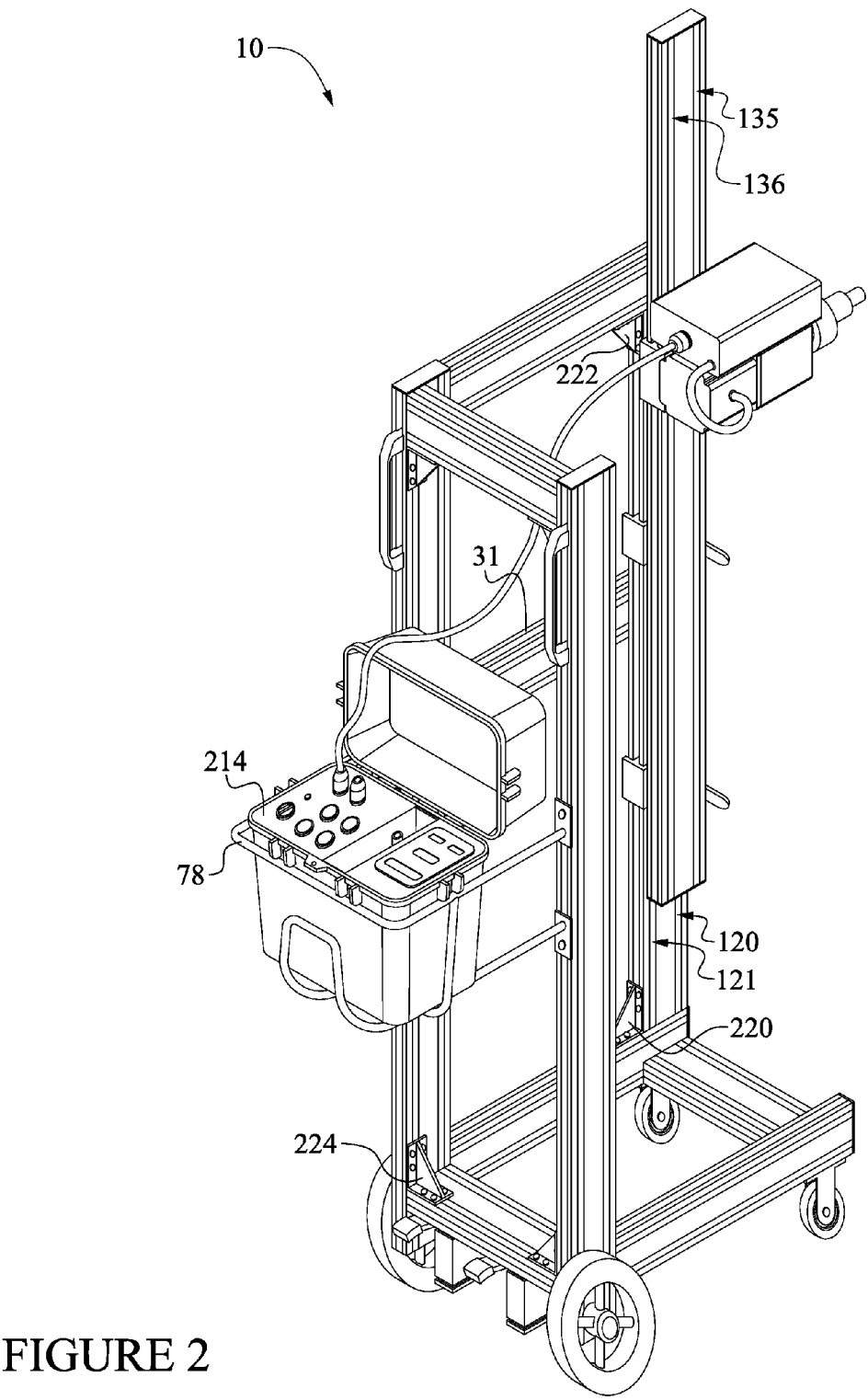
FIG. 2 is another perspective view of the lightweight portable electrical equipment racking tool.

FIG. 2 shows the cart 10 with the controller 214 engaged within a holder, here shown as a basket 78 that is attached to the first and second risers.

Also shown is a fixed mast segment gusset 222, which can be used for reinforcing and strengthening a connection between the fixed mast segment and the first side support. Additional gussets can be used as well such as a first slide support gusset 224 for reinforcing and strengthening the connection between the first riser and the first slide support. A first support gusset 220 is also shown.

A second slide support 31 can be connected between the first riser and the fixed mast segment.

First and second channels 120 and 121 can be disposed on the fixed mast segment. First and second channels 135 and 136 can be disposed on the moving slide segment.

Figure 3:
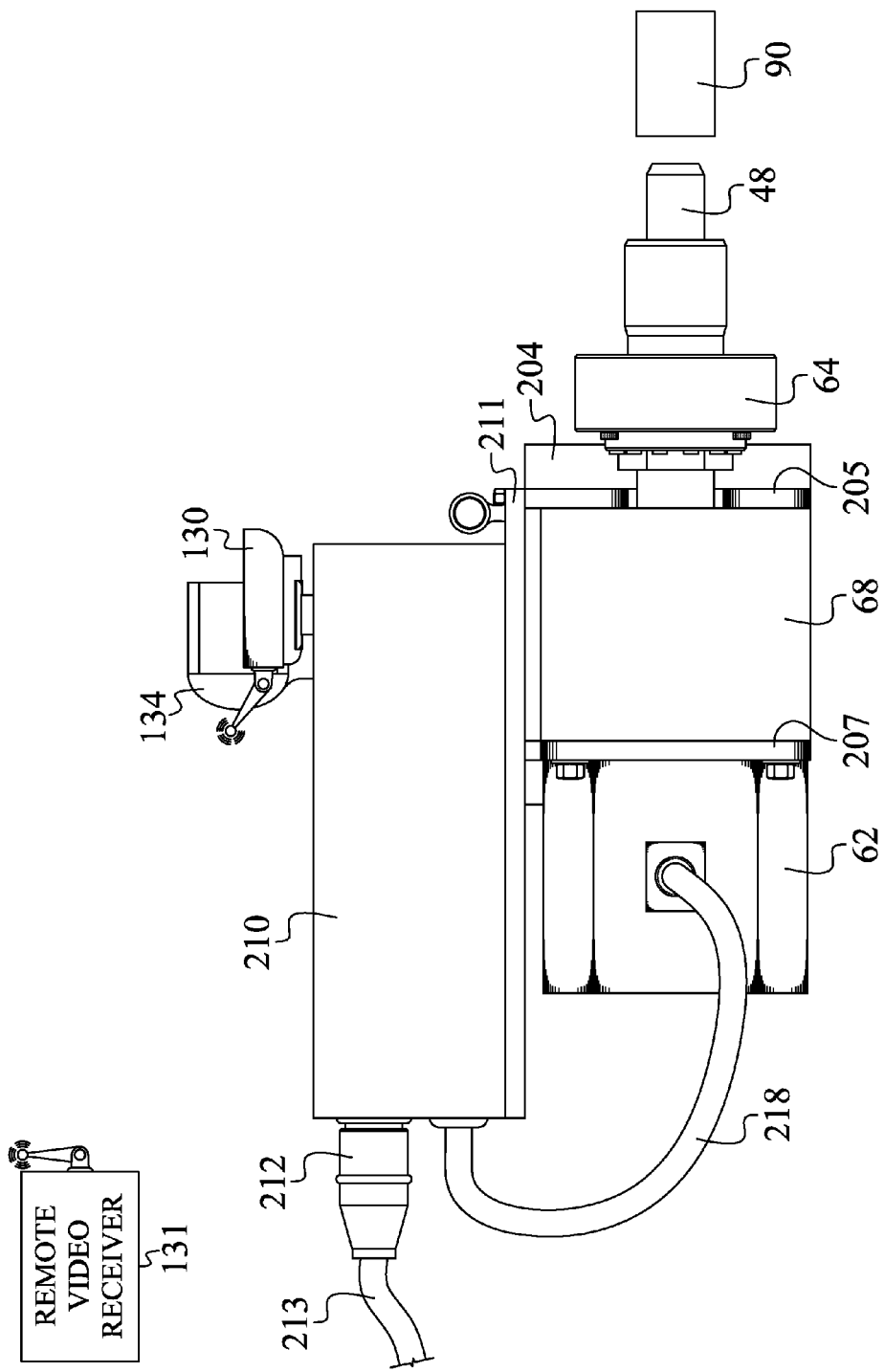
FIG. 3 is a side view of a gear assembly and clutch.

FIG. 3 shows the motor control 210 disposed on the motor control mount plate 211. A light 134 and a wireless video camera 130 can be disposed on the motor control 210. The wireless video camera can be in communication with a remote video receiver 131. Motor control cable 213 can engage motor control plug 212 disposed on the motor control.

The motor control 210 can be in communication with the drive assembly motor 62 through cable 218. The drive assembly motor can be disposed proximate a second side clutch bracket 207. A gear assembly 68 be disposed between the second side clutch bracket and a first side clutch bracket 205.

Also shown is a clutch assembly plate 204, drive coupling 48, clutch 64, and a coupling 90 of a piece of electrical equipment.

Figures 4, 5:
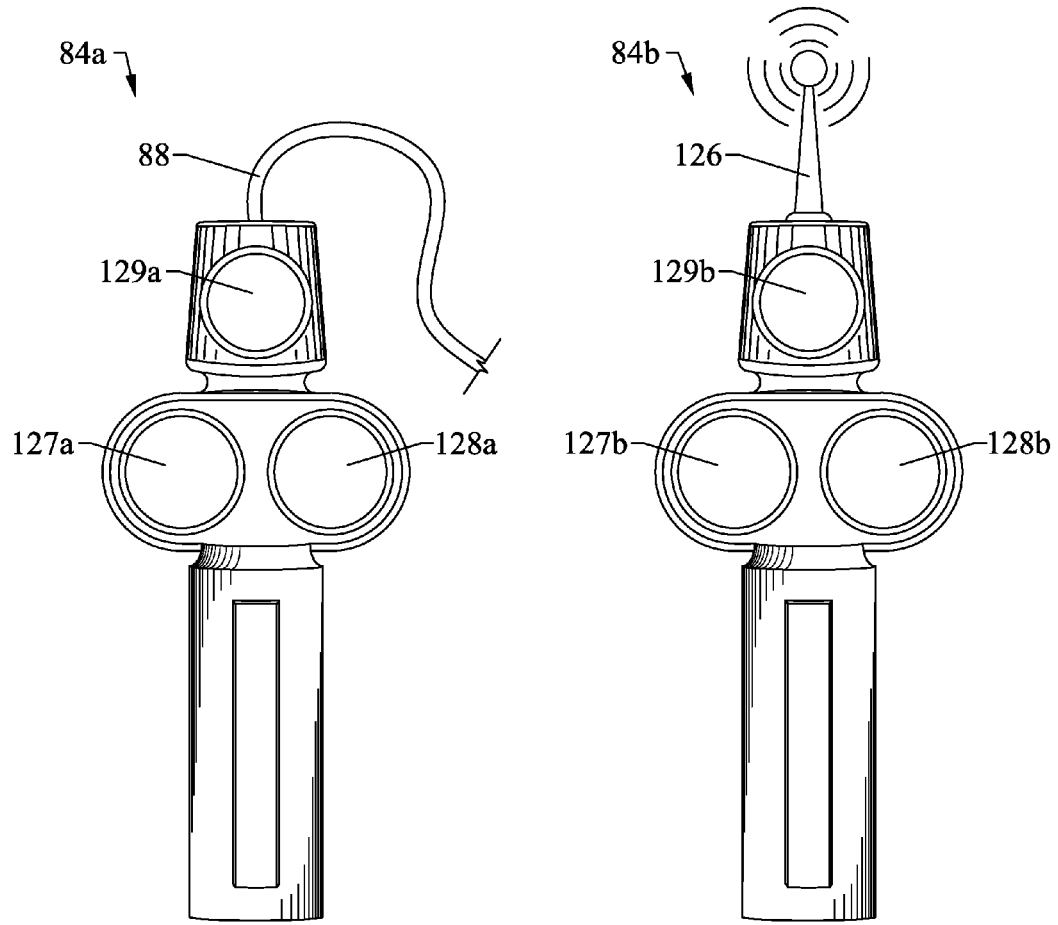
FIG. 4 shows an embodiment of a remote pendant device.
FIG. 5 is another embodiment of a remote pendant device.

FIG. 4 shows an embodiment of a pendant station 84a. The pendant station can have a remove momentary actuation button 127a, an install momentary actuation button 128a, and an on/off actuation button 129a for remotely actuating the controller which can in-turn actuates the motor control. Also shown is a wire 88 which can be in communication with the controller.

FIG. 5 shows another embodiment of the pendant station 84b having a wireless pendant transmitter 126, a remove momentary actuation button 127b, an install momentary actuation button 128b, and an on/off actuation button 129b.

Figure 6:
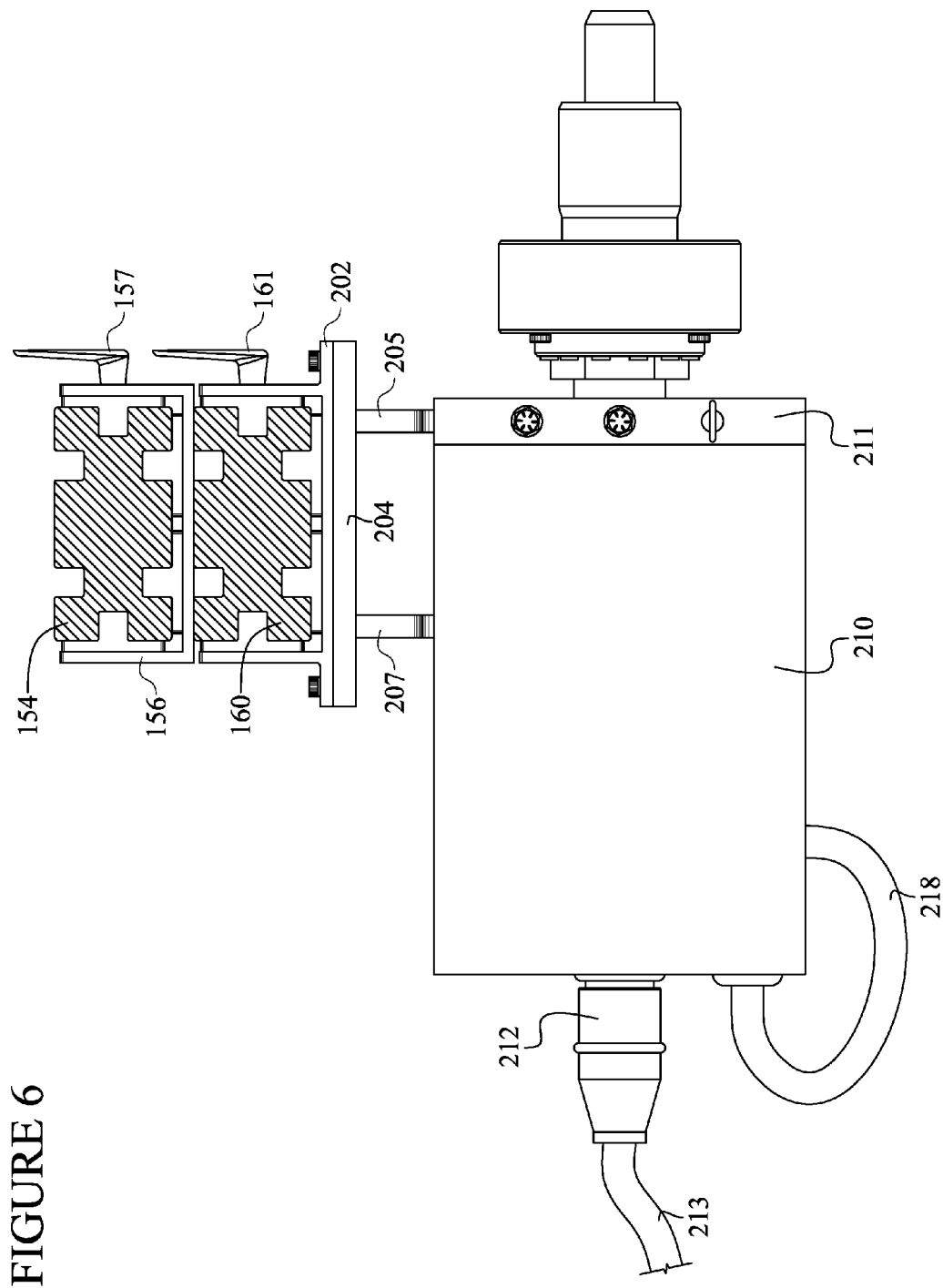
FIG. 6 is a top view of a gear assembly and clutch.

FIG. 6 shows a top view of the motor control 210 disposed on the motor control mount plate 211. Motor control cable 213 can engage motor control plug 212 disposed on the motor control.

Also shown is cable 218, clutch assembly plate 204, first side clutch bracket 205, second side clutch bracket 207, flanged moveable locking bracket 202, moving slide segment 160, fixed mast segment 154, first moveable locking bracket 156, first moveable locking bracket lever 157, and second moveable locking bracket lever 161.

Figure 7:
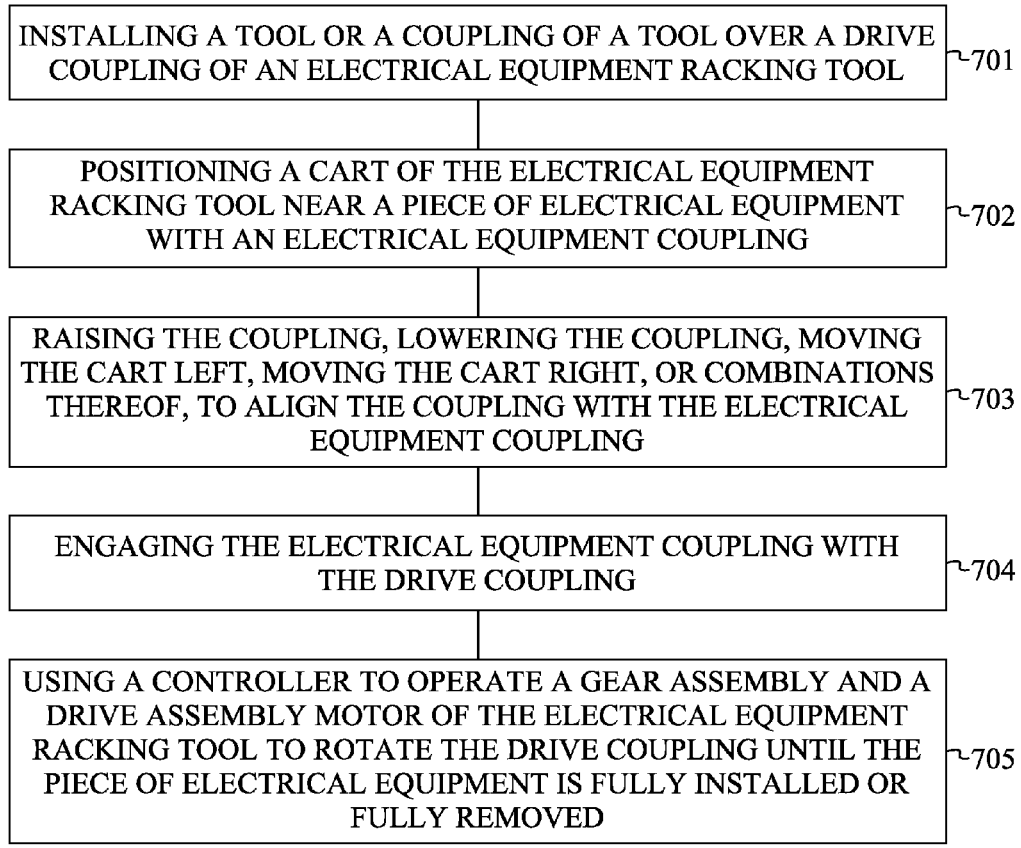
FIG. 7 is a flow chart of illustrative steps of the method.

FIG. 7 shows a flow chart of an embodiment of a method for racking electrical equipment.

A first step 701 can include installing a tool or a coupling of a tool over a drive coupling of an electrical equipment racking tool.

A second step 702 can include positioning a cart of the electrical equipment racking tool near a piece of electrical equipment with an electrical equipment coupling.

A third step 703 can include raising the coupling, lowering the coupling, moving the cart left, moving the cart right, or combinations thereof, to align the coupling with the electrical equipment coupling.

A fourth step 704 can include engaging the electrical equipment coupling with the drive coupling.

A fifth step 705 can include using a controller to operate a gear assembly and a drive assembly motor of the electrical equipment racking tool to rotate the drive coupling until the piece of electrical equipment is fully installed or fully removed.

While these embodiments have been described with emphasis on the embodiments, it should be understood that within the scope of the appended claims, the embodiments might be practiced other than as specifically described herein.

What is claimed is:

1. A lightweight portable electrical equipment racking tool adapted for remote operation, the racking tool comprising:
   a. a cart comprising:
      i. a base frame comprising a first support, a second support, and a front support disposed between the first support and second support, wherein the first support and second support are connected to a back support;
      ii. a first riser connected to the first support;
      iii. a second riser connected to the second support opposite the first riser;
      iv. a first slide support connected to the first riser; and
      v. at least one brace connecting the first riser with the second riser;
   b. a first load bearing wheel connected to the first riser and a second load bearing wheel connected to the second riser;
   c. a first small wheel secured to the first support opposite the first load bearing wheel and a second small wheel secured to the second support opposite the second load bearing wheel, providing stabilization and enhanced swiveling;
   d. a fixed mast segment connected perpendicularly to the first slide support and to the first support;
   e. at least one moveable locking bracket secured to the fixed mast segment;
   f. a moving slide segment connected to the at least one moveable locking bracket, wherein the moving slide segment is adapted to extend above the base frame;
   g. at least one flanged moveable locking bracket secured to the moving slide segment opposite the at least one moveable locking bracket;
   h. a clutch assembly plate secured to the at least one flanged moveable locking bracket;
   i. a clutch bracket secured to the clutch assembly plate comprising a first side clutch bracket and a second side clutch bracket parallel to the first side clutch bracket;
   j. a gear assembly attached to the clutch bracket, wherein the gear assembly comprises a drive assembly motor;
   k. a motor control in communication with the gear assembly and secured to the clutch bracket, wherein the motor control comprises a motor control plug for receiving power and controller signals from a controller, and wherein the motor control communicates with the drive assembly motor to operate the gear assembly;
   l. a clutch connected to the clutch bracket;
   m. a drive coupling secured to the clutch;
   n. a power supply mounted between the first riser and the second riser for charging the controller; and
   o. a first support gusset secured between the first support and the fixed mast segment for keeping the at least one moveable locking bracket spaced apart from the first support.

2. The lightweight portable electrical equipment racking tool of claim 1, further comprising a first floor lock connected to the back support and a second floor lock connected to the back support for removably and lockingly engaging the base frame with the surface.

3. The lightweight portable electrical equipment racking tool of claim 1, further comprising a holder secured to the first and the second risers for supporting the controller.

4. The lightweight portable electrical equipment racking tool of claim 1, further comprising at least one handle mounted to a top portion of the first riser or a top portion of the second riser.

5. The lightweight portable electrical equipment racking tool of claim 1, further comprising a protective hoop extending from the first riser to the second riser and forming a load bearing barrier between the first and second risers and the surface.

6. The lightweight portable electrical equipment racking tool of claim 1, wherein the moving slide segment is raised or lowered by sliding the at least one moveable locking bracket up or down the fixed mast segment.

7. The lightweight portable electrical equipment racking tool claim 1, wherein the clutch assembly plate, the gear assembly, the drive coupling, the drive assembly motor, and the motor control are raised or lowered by sliding the at least one flanged moveable locking bracket up or down along the moving slide segment.

8. The lightweight portable electrical equipment racking tool of claim 1, wherein the at least one moveable locking bracket further comprises a moveable locking bracket lever for removably locking the at least one moveable locking bracket to the first slide support.

9. The lightweight portable electrical equipment racking tool of claim 1, wherein the at least one flanged moveable locking bracket further comprises a flanged moveable locking bracket lever for locking the at least one flanged moveable locking bracket to the moving slide segment.

10. The lightweight portable electrical equipment racking tool of claim 1, wherein the racking tool is adapted for remote installation or removal of circuit breakers having a voltage of less than 38,500 volts.

11. The lightweight portable electrical equipment racking tool of claim 1, further comprising a wireless video camera mounted to the motor control and connected to a remote video receiver, enabling handheld monitoring of signals from the wireless video camera.

12. The lightweight portable electrical equipment racking tool of claim 11, further comprising at least one light connected to the motor control for illuminating a target for the wireless video camera.

13. The lightweight portable electrical equipment racking tool of claim 1, wherein at least one channel is disposed on a side of the first riser, a side of the second riser, a side of the fixed mast segment, and a side of the moving slide segment.

14. The lightweight portable electrical equipment racking tool of claim 1, further comprising:
   a. two channels, each disposed on opposite sides of the fixed mast segment; and
   b. two channels, each disposed on opposite sides of the moving slide segment.

15. The lightweight portable electrical equipment racking tool of claim 1, further comprising a motor control mount plate secured to the gear assembly and to the clutch bracket.

* * * * *